US010015532B2

(12) United States Patent
Fujita

(10) Patent No.: US 10,015,532 B2
(45) Date of Patent: Jul. 3, 2018

(54) RECORDING AND REPRODUCING APPARATUS

(71) Applicant: FUNAI ELECTRIC CO., LTD., Osaka (JP)

(72) Inventor: Shinji Fujita, Osaka (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 127 days.

(21) Appl. No.: 15/255,206

(22) Filed: Sep. 2, 2016

(65) Prior Publication Data

US 2017/0078709 A1    Mar. 16, 2017

(30) Foreign Application Priority Data

Sep. 15, 2015  (JP) ................. 2015-181915

(51) Int. Cl.
| | |
|---|---|
| H04N 21/235 | (2011.01) |
| G06F 17/30 | (2006.01) |
| H04N 21/84 | (2011.01) |
| H04N 21/278 | (2011.01) |
| H04N 21/482 | (2011.01) |
| H04N 21/433 | (2011.01) |

(52) U.S. Cl.
CPC ..... *H04N 21/235* (2013.01); *G06F 17/30849* (2013.01); *H04N 21/278* (2013.01); *H04N 21/4334* (2013.01); *H04N 21/4821* (2013.01); *H04N 21/4826* (2013.01); *H04N 21/4828* (2013.01); *H04N 21/84* (2013.01)

(58) Field of Classification Search
None
See application file for complete search history.

(56) References Cited

U.S. PATENT DOCUMENTS

| | | | | |
|---|---|---|---|---|
| 5,619,700 A | * | 4/1997 | Abe .................. | G06F 8/71 707/999.202 |
| 2003/0200545 A1 | | 10/2003 | Nakada | |
| 2006/0156339 A1 | | 7/2006 | Ozawa | |

(Continued)

FOREIGN PATENT DOCUMENTS

| | | |
|---|---|---|
| EP | 1531623 A1 | 5/2005 |
| EP | 1624682 A1 | 2/2006 |

(Continued)

OTHER PUBLICATIONS

European Patent Office, Extended European Search Report for Application No. 16187389.8, dated Jan. 17, 2017, 9 pages, Germany.

*Primary Examiner* — Eileen M Adams
(74) *Attorney, Agent, or Firm* — Alston & Bird LLP

(57) ABSTRACT

A recording and reproducing apparatus changes program names efficiently to improve user's convenience.
A controller changes a name of a target program, for which information is stored in a program information DB, in accordance with an instruction made via an instruction input. The controller changes, based on the change in the target program, a name(s) of associated one(s) of programs for which information is stored in the program information DB. The associated one(s) has/have a specific attribute in common with the target program. Accordingly, changing of the name of the target program made by a user is automatically reflected to the program(s) associated with the target program.

19 Claims, 10 Drawing Sheets

(56) References Cited

U.S. PATENT DOCUMENTS

| | | |
|---|---|---|
| 2008/0002940 A1 | 1/2008 | Tsunoda |
| 2008/0307461 A1 | 12/2008 | Tanikawa |
| 2009/0055874 A1 | 2/2009 | Yamamoto |
| 2009/0180754 A1 | 7/2009 | Kimura et al. |
| 2009/0217322 A1* | 8/2009 | Hindle .................... H04N 7/16 725/39 |
| 2011/0026903 A1* | 2/2011 | Singh .................... H04N 5/765 386/297 |
| 2013/0226996 A1 | 8/2013 | Itagaki et al. |

FOREIGN PATENT DOCUMENTS

| | | |
|---|---|---|
| JP | 2003-046921 A | 2/2003 |
| JP | 2007-124620 A | 5/2007 |
| JP | 2009-005124 A | 1/2009 |
| JP | 2009-049802 A | 3/2009 |
| JP | 4656527 B2 | 3/2011 |

* cited by examiner

"NNK_HSCR_EN_EP_1"
↓
"HSCR_EN_EP_1": "NNK_" DELETED
↓
"HSEN_EP_1": "CR_" DELETED

"NNK_HSCR_EN_EP_2"
↓
"HSEN_EP_2"

"NNK_ HSCR_ EN_EP_1"
↓
"NNK_ HSCR_ ENGM_EP_1": "GM" ADDED BETWEEN "N" AND "_"

"NNK_ HSCR_ EN_EP_2"
↓
"NNK_ HSCR_ ENGM_EP_2"

FIG.11

"NNK_ HSCR_ EN_EP_1"
↓
"NNK_ HSCR_ ENGM_EP_1": "GM" ADDED BETWEEN "N" AND "_"
↓
"NNK_ HSCR_ ENGM_1": "_EP" DELETED

FIG.12

"NNK_ HSCR_ EN_EP_2"
↓
"NNK_ HSCR_ ENGM_2"

FIG.13

"NNK_ HSEN_BSEN_EP_1"
↓
"NNK_HS_BSEN_EP_1": "EN" DELETED

FIG.14

"NNK_HSEN_BSEN_EP_2"
    ↓
(a) "NNK_HS_BSEN_EP_2"
(b) "NNK_HSEN_BS_EP_2"

FIG.15

"NNK_HSEN_BSEN_EP1"
    ↓
"NNK_HSEN_BSENGM_EP1": "GM" ADDED BETWEEN "N" and "_"

FIG.16

"NNK_HSEN_BSEN_FNL"
    ↓
(a) "NNK_HSENGM_BSEN_FNL"
(b) "NNK_HSEN_BSENGM_FNL"

RECORDING AND REPRODUCING APPARATUS

CROSS-REFERENCE TO RELATED APPLICATION

This application claims priority to and the benefit of Japanese Patent Publication No. 2015-181915 filed on Sep. 15, 2015, the entire disclosure of which as is incorporated by reference herein.

BACKGROUND

Related Field

The present disclosure relates to recording and reproducing apparatuses such as hard disk drive (HDD) recorders.

Description of Related Art

Various suggestions have been made to change program information such as program names in a recording and reproducing apparatus. For example, Japanese Patent No. 4656527 discloses extracting attribute information from data of program being recorded, and replacing, for example, the stored name of a recorded program with an extracted program name. Japanese Unexamined Patent Publication No. 2009-5124 discloses conveniently changing program name information on recorded programs using EPG information. Japanese Unexamined Patent Publication No. 2009-49802 teaches easily searching for a user's desired program by displaying information which is uncommon among episodes having the same program name.

BRIEF SUMMARY

The present disclosure provides a recording and reproducing apparatus efficiently changing program names to improve the user's convenience.

The recording and reproducing apparatus according to the present disclosure includes a database storing information on programs reserved for recording and/or recorded programs, the information containing at least program names; and a controller changing a name of a target program, for which information is stored in the database, in accordance with an instruction made via an instruction input. The controller changes, based on a change in the name of the target program, a name(s) of associated one(s) of programs for which information is stored in the program information database. The associated one(s) has/have a specific attribute in common with the target program.

BRIEF DESCRIPTION OF THE FIGURES

FIG. 11 illustrates exemplary changing of a program name made by a user.

FIG. 12 illustrates exemplary changing of a program name according to the change in FIG. 11.

FIG. 13 illustrates exemplary changing of a program name made by a user.

FIG. 14 illustrates exemplary changing of a program name according to the change in FIG. 13, where there are change options.

FIG. 15 illustrates exemplary changing of a program name made by a user.

FIG. 16 illustrates exemplary changing of a program name according to the change of FIG. 15, where there are change options.

DETAILED DESCRIPTION OF VARIOUS EMBODIMENTS

Figure 1:
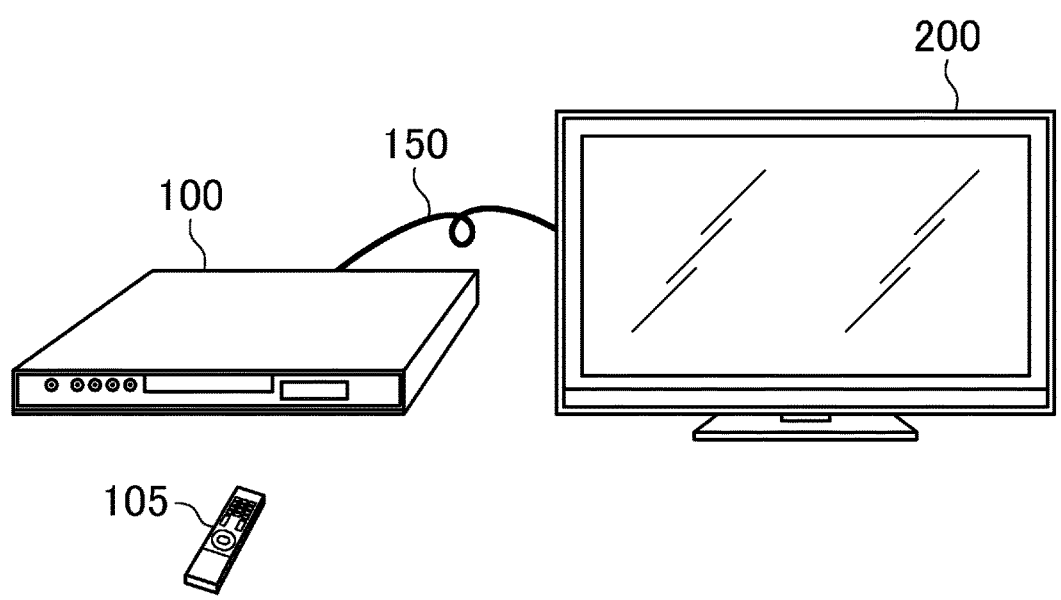
FIG. 1 illustrates the appearance of a video reproducing system including a recording and reproducing apparatus.

In recording and reproducing apparatuses, there is often a limit on the number of characters of program names to be displayed in a user interface such as a recording reservation list displaying a list of program names at one time. In this case, with respect to programs of, for example, a drama series having the same program name and different episode numbers, the episode numbers could be deleted from the respective program names displayed in the user interface. Then, the contents of the programs are not easily recognized. This problem is solved when the user changes the program names properly. However, changing all the program names alike is troublesome for the user. Similarly, when the user wishes to change program names, changing all the program names alike is troublesome for the user.

According to an aspect of the present disclosure, a recording and reproducing apparatus includes a database storing information on programs reserved for recording and/or recorded programs, the information containing at least program names; and a controller changing a name of a target program, for which information is stored in the database, in accordance with an instruction made via an instruction input. The controller changes, based on a change in the name of the target program, a name(s) of associated one(s) of programs for which information is stored in the database. The associated one(s) has/have a specific attribute in common with the target program.

According to this aspect, the controller changes the name of the target program, for which information is stored in the database, in accordance with the instruction made via the instruction input. Then, the controller changes, based on the change in the target program, the name(s) of the associated one(s) of the programs for which information is stored in the database. The associated one(s) has/have the specific attribute in common with the target program. Accordingly, changing of the name of the target program made by a user is automatically reflected to the program(s) associated with the target program. This results in effective changing of the program name(s) to improve user's convenience.

In the recording and reproducing apparatus according this aspect, the controller may cause a display to display a user interface, for changing the program names, including the name of the target program, and receive the instruction for changing the name of the target program via the instruction input.

With this configuration, the user easily sends the instruction for changing the program name while viewing the user interface.

In the name of the target program displayed in the user interface, a character string displayable on a program list and a character string not displayable may be distinguishable.

This causes the user to easily determine how to change the program name(s).

The recording and reproducing apparatus according this aspect may further include a storage storing the change made by the controller. The controller may cause the storage to store the change in the name of the target program, and read the change from the storage in changing the name(s) of the associated one(s).

With this configuration, the change in the name of the target program is stored in the storage. The name(s) of the associated program(s) is/are changed based on the change read from the storage. Accordingly, changing of the name of the target program made by the user is reliably reflected to the program(s) associated with the target program.

In the recording and reproducing apparatus according this aspect, in a case of deleting a character string as changing of the name of the target program, the controller may cause the storage to store the deleted character string as the change.

With this configuration, in the case where the character string is deleted as the changing of the program name, the deleted character string is stored. This leads to reliable changing of the name(s) of the associated program(s).

In the recording and reproducing apparatus according this aspect, in a case of adding a character string as changing of the name of the target program, the controller may cause the storage to store the added character string and at least one character before and/or after a position, in which the character string is added, as the change.

With this configuration, in the case where the character string is added as the changing of the program name, the added character string and at least one character indicating the position in which the character string is added, are stored. This leads to reliable changing of the name(s) of the associated program(s).

In the recording and reproducing apparatus according this aspect, based on the change in the name of the target program, the controller may cause the storage to store an original program name of the target program together with the change.

With this configuration, the original program name is stored together with the change. Thus, the program name can be easily returned to the original one.

In the recording and reproducing apparatus according this aspect, in a case of adding a character string and deleting a character string as changing of the name of the target program, the controller may cause the storage to store the added character string, at least one character before and/or after a position, in which the character string is added, and the deleted character string as the change.

With this configuration, in the case where the character string is added and the character string is deleted as the changing of the program name, the added character string, at least one character indicating the position in which the character string is added, and the deleted character string are stored. This leads to reliable changing of the name(s) of the associated program(s).

In the recording and reproducing apparatus according this aspect, the controller may change the name(s) of the associated one(s) based on the change read from the storage.

With this configuration, changing of the name of the target program made by the user is reliably reflected to the program(s) associated with the target program.

In the recording and reproducing apparatus according this aspect, a controller may cause the display to display the name(s) of the associated one(s) to be changed.

This configuration causes the user to confirm the name(s) of the associated program(s) before the name(s) of the associated program(s) is/are changed.

In the recording and reproducing apparatus according this aspect, in a case where there are options for a new name(s) in changing the name(s) of the associated one(s), the controller may determine, as the new name(s) of the associated one(s), one of the options having characters in common with a new name of the target program at a highest rate.

With this configuration, in the case where there are options for the new name(s) of the associated program(s), the one of the options having characters in common with the new name of the target program at the highest rate is determined as the new name(s) of the associated program(s). This leads to reliable selection of a proper name(s) of the associated program(s), even when there are options.

In the recording and reproducing apparatus according this aspect, in a case where there are options for a new name(s) in changing the name(s) of the associated one(s), the controller may determine, as the new name(s) of the associated one(s), one of the options displayed on the display and selected via the instruction input.

With this configuration, in the case where there are options for the new name(s) of the associated program(s), one of the options displayed on the display and selected via the instruction input is determined as the new name(s) of the associated program(s). This leads to reliable selection of a proper name(s) of the associated program(s), even when there are options.

In the recording and reproducing apparatus according this aspect, based on a change in a name of any of a series of regularly broadcast programs as the target program, the controller may change names of the other programs of the series as the associated ones.

With this configuration, changing of the name of any of the series of regularly broadcast programs made by the user is automatically reflected to the other programs of the series.

The recording and reproducing apparatus according this aspect may further include a searcher searching for, as the associated one(s), one(s) of the programs for which information is stored in the database, the one(s) having a specific attribute in common with the target program. The controller may change, based on the change in the target program, the name(s) of the associated one(s) found by the searcher.

With this configuration, the searcher searches for, as the associated program(s), the one(s) of the programs for which information is stored in the database. The one(s) has/have the specific attribute in common with the target program. Then, the controller changes, based on the change in the target program, the name(s) of the associated program(s) found by the searcher. As a result, the changing of the name of the target program made by the user is automatically reflected to the program(s) associated with the target program.

In the recording and reproducing apparatus according this aspect, the searcher may use, as the specific attribute, a channel, a broadcast day of week, and a broadcast slot to search for, as the associated one(s), one(s) of the programs having the channel, the broadcast day of week, and the broadcast slot in common with the target program.

With this configuration, changing of the name of the target program made by the user is automatically reflected to the program(s) having the channel, the broadcast day of week, and the broadcast slot in common with the target program.

In the recording and reproducing apparatus according this aspect, the searcher may use program names as the specific attribute to search for, as the associated one(s), one(s) of the programs having a name(s) containing characters in common with the original name of the target program in respective positions. The number of the characters is larger than or equal to a predetermined threshold.

With this configuration, changing of the name of the target program made by the user is automatically reflected to the program(s) having the name similar to the name of the target program.

In the recording and reproducing apparatus according this aspect, the searcher may use program ID as the specific attribute to search for, as the associated one(s), one(s) of the programs having the program ID in common with the target program.

With this configuration, changing of the name of the target program made by the user is automatically reflected to the program(s) having the program ID in common with the target program.

In the recording and reproducing apparatus according this aspect, the program names may be changeable at at least one of a time of recording reservation, a time of displaying a list of programs reserved for recording, and a time of displaying a list of recorded programs.

In the recording and reproducing apparatus according this aspect, a target(s) whose name(s) is/are to be changed may be selectable from the programs reserved for recording and/or the recorded programs.

According to the present disclosure, changing of the name of the target program made by the user is automatically reflected to the program(s) associated with the target program. This results in effective changing of the program name(s) to improve user's convenience.

The embodiments of the present disclosure will now be described with reference to the drawings.

First Embodiment

FIG. 1 illustrates the appearance of an exemplary video reproducing system including a recording and reproducing apparatus according to an embodiment. The system of FIG. 1 includes a recording and reproducing apparatus 100, and a display 200 connected to the recording and reproducing apparatus 100 via a cable 150. The recording and reproducing apparatus 100 records programs (contents) transmitted via broadcast waves, for example, and reproduces the recorded programs. The recording and reproducing apparatus 100 is, for example, a hard disk drive (HDD) recorder or a Blu-ray Disc (registered trademark; BD) recorder. The display 200 displays TV broadcast programs and the programs recorded in the recording and reproducing apparatus 100. A user uses a remote controller 105, for example, to reproduce the programs recorded in the recording and reproducing apparatus 100, and views the programs on the display 200.

Figure 2:
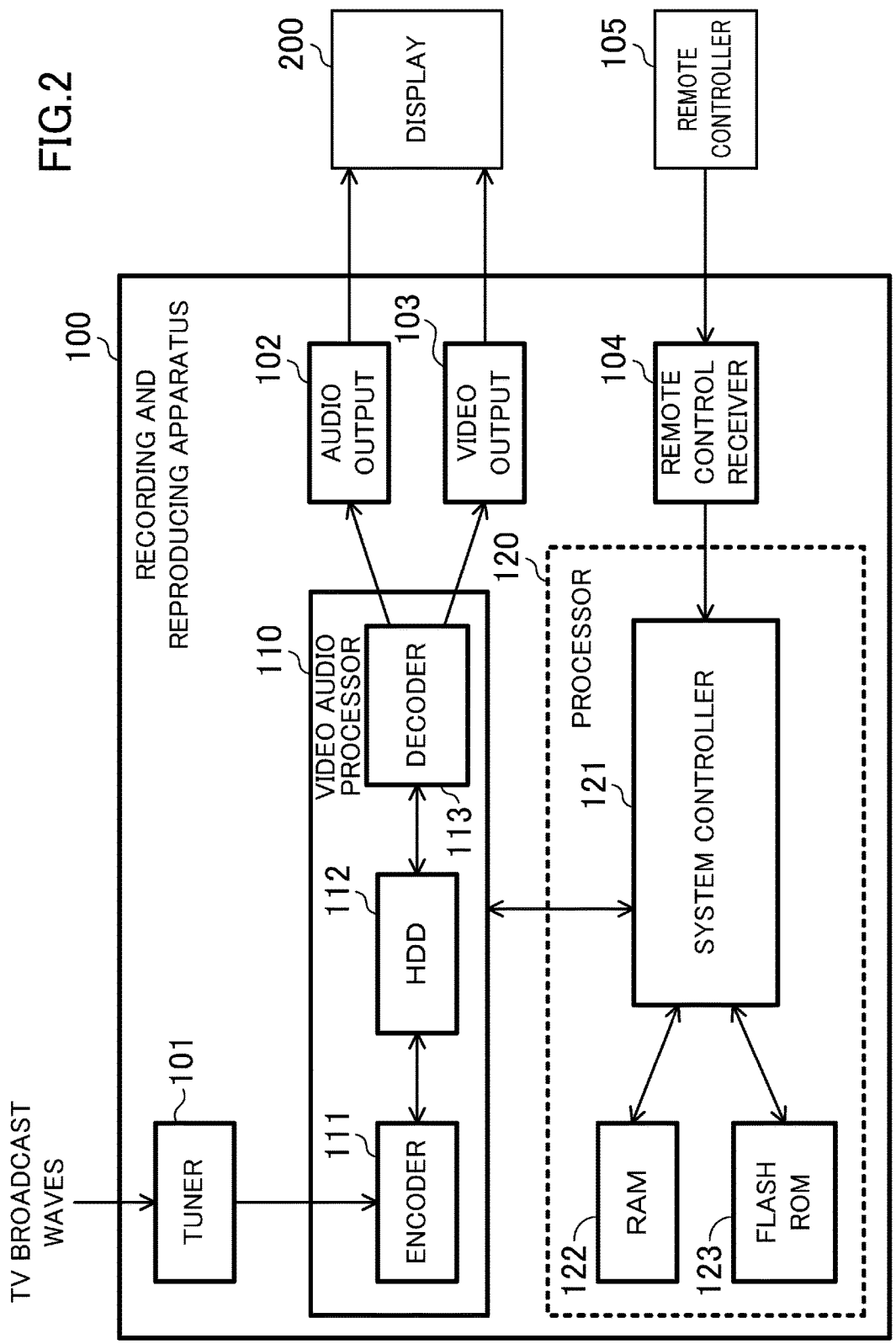
FIG. 2 is a block diagram illustrating an exemplary configuration of hardware of the recording and reproducing apparatus.

FIG. 2 is a block diagram generally illustrating an exemplary configuration of hardware of the recording and reproducing apparatus 100. In the configuration of FIG. 2, a tuner 101 receives content signals of programs via television broadcast waves received at an antenna, for example. A video audio processor 110 includes an encoder 111, an HDD 112, and a decoder 113. The encoder 111 encodes the content signals received at the tuner 101. The HDD 112 stores video contents encoded by the encoder 111. The decoder 113 decodes the video contents stored in the HDD 112, and generates video data in a format that can be displayed on the display 200 and audio data in a format that can be output through a speaker. For example, a BD may be used in place of the HDD 112.

The audio output 102 outputs the audio data generated by the decoder 113 to the display 200. The output audio data is output through the speaker of the display 200. A video output 103 outputs the video data generated by the decoder 113 to the display 200. The output video data is displayed on the display 200.

A remote control receiver 104 receives signals for operating the recording and reproducing apparatus 100 from the remote controller 105 of the recording and reproducing apparatus 100. The system controller 121 controls processing of the video audio processor 110 based on the signals, etc. received by the remote control receiver 104. A RAM 122 is a volatile memory temporarily storing data utilized for control processing by the system controller 121. A flash ROM 123 is a non-volatile memory storing data utilized for control processing by the system controller 121. The system controller 121, the RAM 122, and the flash ROM 123 are included in a processor 120. This processor 120 executes other processing such as changing of program names, which will be described later.

Figure 3:
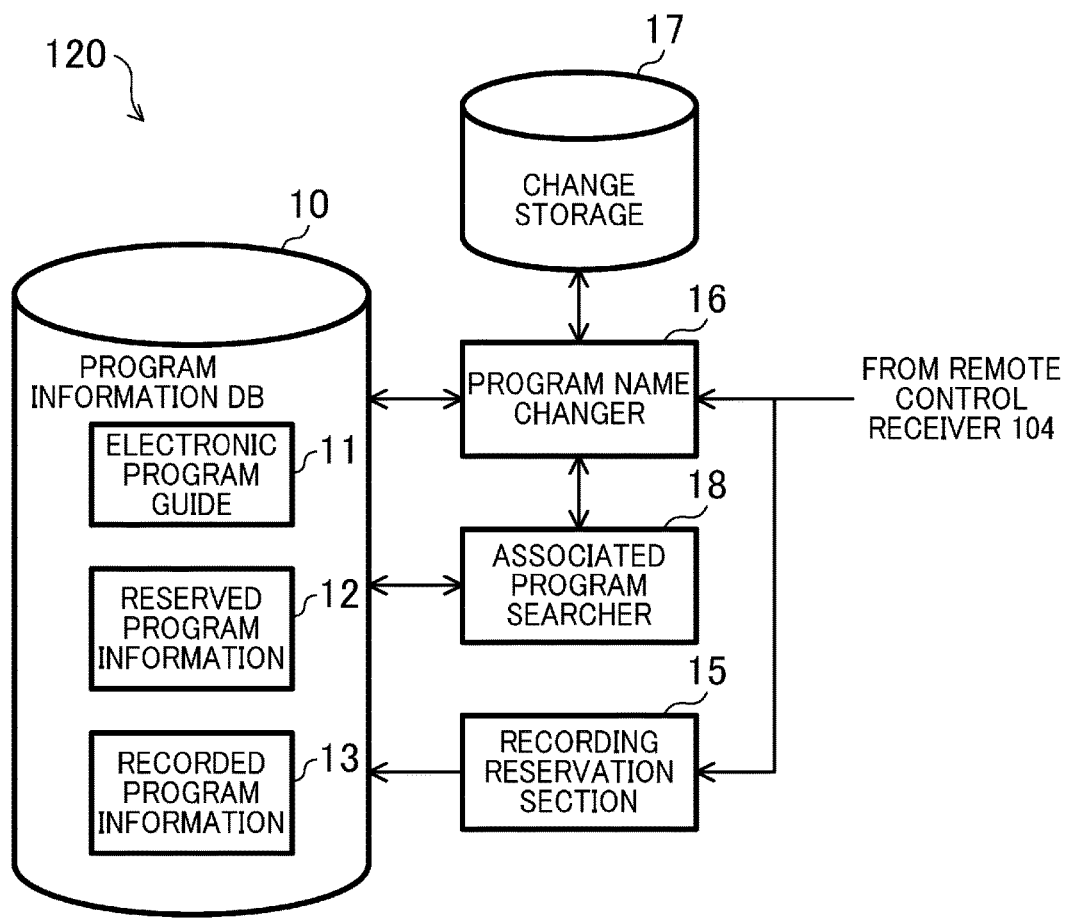
FIG. 3 is a block diagram illustrating the function and configuration of a processor of the recording and reproducing apparatus according to an embodiment.

FIG. 3 is a block diagram illustrating the function and configuration of the processor 120 associated with changing of program names. In FIG. 3, a program information database (DB) 10 stores an electronic program guide 11, reserved program information 12, and recorded program information 13. The electronic program guide 11 is received at the tuner 101. The reserved program information 12 is the information on the programs reserved by the user for recording. The recorded program information 13 is the information on the recorded programs. The program information contains at least program names, and may also contain subtitles, broadcast slots, broadcast channels, and cast. A recording reservation section 15 accepts reservations of the programs selected by the user via the remote controller 105.

A program name changer 16, which is an example of a controller, changes the name of one of programs as a target program in accordance with a user's instruction. Information on the programs is stored in the program DB 10. The instruction is sent to the program name changer 16 via the remote control receiver 104 in accordance with the user's operation via the remote controller 105 which is an example of an instruction input. The change storage 17 temporarily stores the change made by the program name changer 16. The program name changer 16 changes, based on the change in the name of the target program stored in the change storage 17, the name of the associated one of the programs for which information is stored in the program DB 10. The associated one has a specific attribute in common with the target program.

In this embodiment, the name of the target program, which is one of a series of regular programs broadcast at a channel at the same time every week, for example, is changed. Based on the change in the name of the target program, the program name changer 16 makes the same change in the other programs of the series as associated programs. In this case, the channel and the broadcast time are used as the specific attribute.

An associated program searcher 18 searches for, as the associated programs, ones of the programs for which information is stored in the program DB 10. The program has a specific attribute in common with the target program whose name has changed by the program name changer 16. Based on the change in the name of the target program, the program name changer 16 may change the names of the associated programs found by the associated program searcher 18. The associated program searcher 18 will be described in a third embodiment.

The recording reservation section 15, the program name changer 16, and the associated program searcher 18 operate when, for example, a processor provided in the system controller 121 executes programs stored in the flash ROM 123. The change storage 17 is implemented, for example, by the RAM 122. The program information DB 10 is implemented, for example, by the flash ROM 123.

Figure 4:
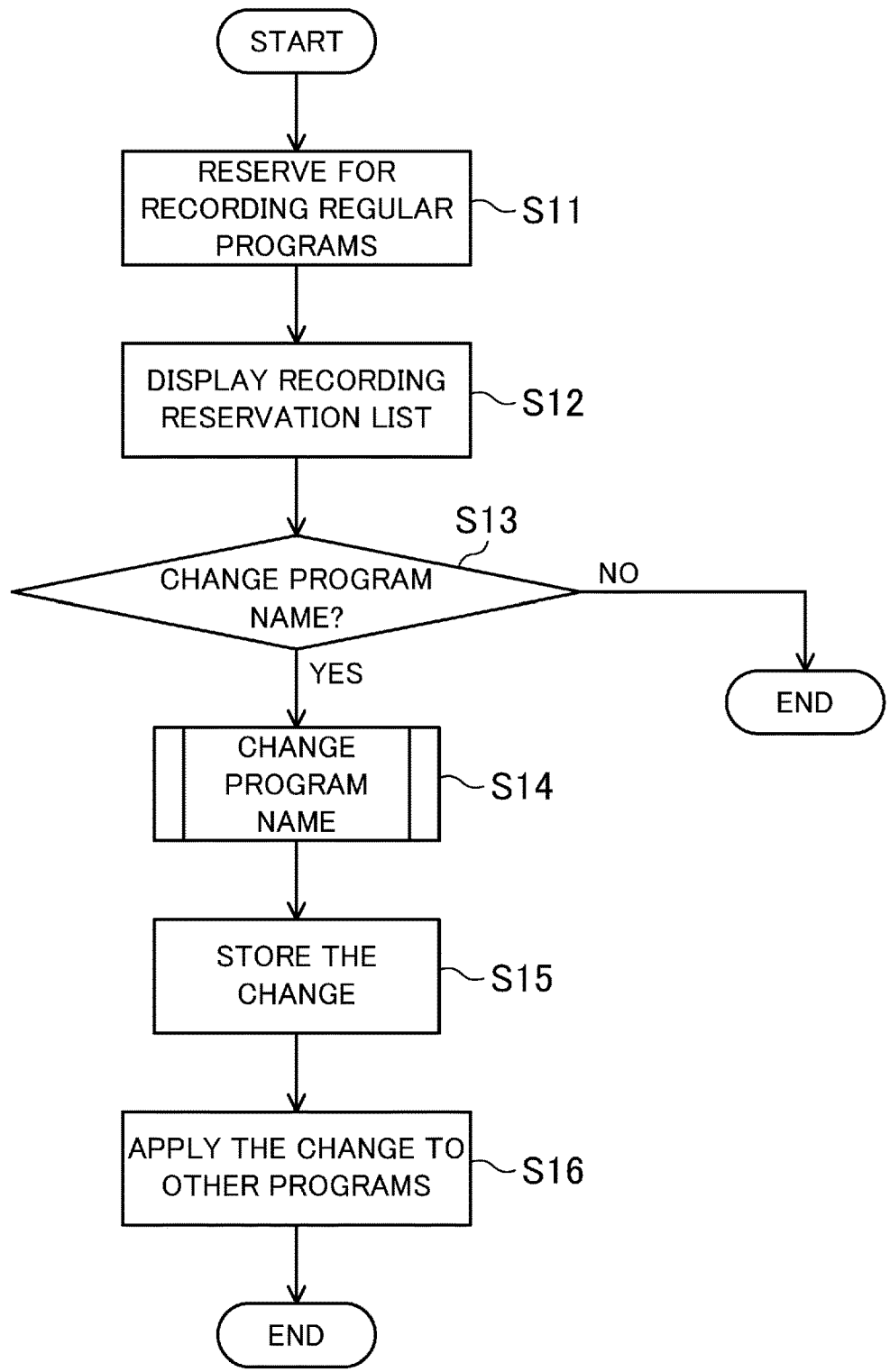
FIG. 4 is a flow chart illustrating exemplary processing for changing program names according to a first embodiment.

Now, changing of a program name performed by the recording and reproducing apparatus 100 will be described in detail. FIG. 4 is a flow chart showing an exemplary procedure for changing the program name in this embodiment. In this embodiment, the user makes regular recording, that is, reserves a series of regularly broadcast programs at one time. The program reserved for recording is an imaginary education program named "NNK High School Course, English."

Figures 5, 6, 7:
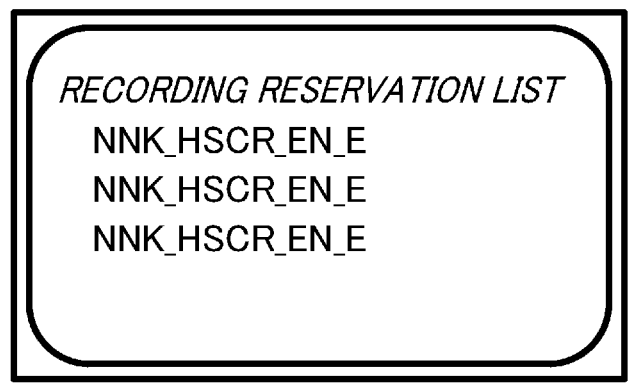
FIG. 5 illustrates an exemplary user interface displaying a recording reservation list.
FIG. 6 illustrates exemplary changing of a program name made by a user.
FIG. 7 illustrates exemplary changing of a program name according to the change in FIG. 6.

First, the user makes a recording reservation of all episodes of the "NNK High School Course, English" (S11). Then, the program DB 10 stores, as the reserved program information 12, the program information on all episodes of the "NNK High School Course, English." The user causes the user interface of the display 200 to display a recording reservation list as shown in FIG. 5 (S12). At this time, if there is a limit on the number of characters in displaying the program names, part of the program names is deleted as shown in FIG. 5, which makes the episodes indistinguishable from each other. Then, the user selects one of programs displayed in the list, and changes the name of the program (YES in S13). If there is no need to change any program name, the processing ends (NO in S13).

The program name is changed (S14) as shown in FIG. 6, for example. Assume that the name of the program selected by the user and obtained from an electronic program guide is "NNK_HSCR_EN_EP_1." The abbreviations "HS," "CR," "EN," and "EP" stand for "high school," "course," "English," and "episode" respectively. For example, the user deletes character strings so that this program is distinguishable from the other programs on the displayed list. First, the user deletes the character string "NNK_" from the program name. The user further deletes the character string "CR_" from the program name. As a result, the program name is changed to "HSEN_EP_1." In the user interface for this change, for example, the color of a character string not displayable may be changed so that a character string displayable on the displayed list is distinguishable from the character string not displayable.

Figures 8, 9, 10:
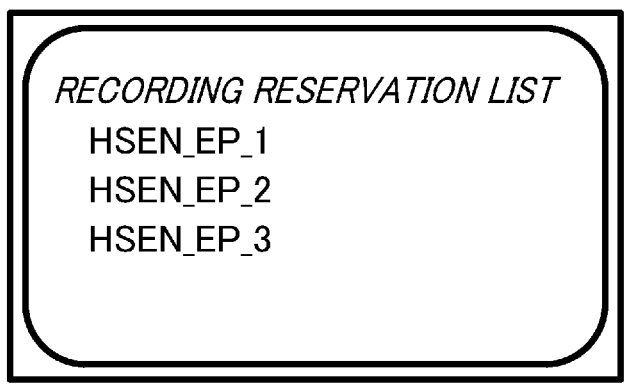
FIG. 8 illustrates an exemplary user interface displaying a recording reservation list based on a change in program names.
FIG. 9 illustrates exemplary changing of a program name made by a user.
FIG. 10 illustrates exemplary changing of a program name according to the change in FIG. 9.

Based on the change in the program name, the program name changer 16 causes the change storage 17 to store the deleted character strings "NNK" and "CR" as the change (S15). The program name changer 16 applies the stored change to the other regular programs reserved for recording (S16). Accordingly, as shown in FIG. 7, for example, the program name "NNK_HSCR_EN_EP_2" is changed to "HSEN_EP_2" automatically. This results in display of the recording reservation list, in which the programs are distinguishable, in the user interface as shown in FIG. 8.

While the character strings are deleted to change the program name in the example described above, a character string(s) may be added. For example, as shown in FIG. 9, the user adds a character string "GM" between the characters "N" and the subsequent "_" of a program name "NNK_H-SCR_EN_EP_1." The abbreviation "GM" stands for "grammar." As a result, the program name is changed to "NNK_H-SCR_ENGM_EP_1." Based on the change in the program name, the program name changer 16 causes the change storage 17 to store, as the change, the added character string "GM," and the characters "N" and "_" before and after the position in which the character string is added. The program name changer 16 applies the stored change to the other regular programs reserved for recording. Accordingly, for example, as shown in FIG. 10, the program name "NNK_H-SCR_EN_EP_2" is changed to "NNK_HSCR_ENG-M_EP_2" automatically. The added character string and the character before or after the position in which the character string is added may be stored as the change. Alternatively, a character string before and/or after the position in which the character string is added may be stored. In short, the added character string and at least one character before and/or after the position in which the character string is added are stored as the change.

Both of deletion and addition of character strings may be implemented. For example, as shown in FIG. 11, the user adds a character string "GM" between the characters "N" and the subsequent "_" of a program name "NNK_H-SCR_EN_EP_1." In addition, the user deletes the character string "_EP." As a result, the program name is changed to "NNK_HSCR_ENGM_1." Based on the change in the program name, the program name changer 16 causes the change storage 17 to store, as the change, the added character string "GM," the characters "N" and "_" before and after the position in which the character string is added, and the deleted character string "_EP." The program name changer 16 applies the stored change to the other regular programs reserved for recording. Accordingly, for example, as shown in FIG. 12, the program name "NNK_HSCR_EN_EP_2" is changed to "NNK_HSCR_ENGM_2."

As described above, according to this embodiment, the program name changer 16 changes the name of the target program for which information is stored in the program information DB 10 in accordance with an instruction made via the remote controller 105. The program name changer 16 changes, based on the change in the target program, the names of associated ones of the programs for which information is stored in the program information DB 10. The associated ones have a specific attribute in common with the target program. Accordingly, the changing of the name of the target program made by the user is automatically reflected to the programs associated with the target program. This results in effective changing of the program names to improve user's convenience.

The programs whose names are to be changed may be displayed on the display 200 to cause the user to confirm whether or not the changing of the program names is acceptable.

Second Embodiment

In the second embodiment, proceeding where the change made by the user is applied to the other program names and there are options for new program names. The configurations of the device and basic processing are similar to those in the first embodiment.

An example shows that a character string is deleted as changing of a program name. For example, as shown in FIG. 13, assume that the name of the target program obtained from the electronic program guide is "NNK_HSEN_BSEN_EP_1." The abbreviation "BS" stands for "basic." The user deletes, for example, the character string "EN" from the program name. The program name contains two character strings of "EN." The user deletes the character string "EN" following "HS." As a result, the program name is changed to "NNK_HS_BSEN_EP_1."

Based on the change in the program name, the program name changer 16 causes the change storage 17 to store the deleted character string "EN" as the change. The program name changer 16 applies the stored change to the other regular programs reserved for recording. At this time, for example, as shown in FIG. 14, there are two options "NNK_HS_BSEN_EP_2" and "NNK_HSEN_BS_EP_2" changed from the program name "NNK_HSEN_BSEN_EP_2." When there are options for the new program name, the program name changer 16 determines, as the new program name, the one that has characters, at the highest matching rate, in common with the program name changed by the user. The matching rate is the rate at which the characters of program names match in respective positions. In the example of FIG. 14, "NNK_HS_BSEN_EP_2," which has characters in common at a higher rate, is employed as the new program name.

A character string(s) may be added similarly. For example, as shown in FIG. 15, assume that the name of the target program obtained from the electronic program guide is "NNK_HSEN_BSEN_EP1." The abbreviation "EP1" stands for "first episode." The user adds, for example, the character string "GM" after "BSEN." As a result, the program name is changed to "NNK_HSEN_BSENGM_EP1."

Based on the change in the program name, the program name changer 16 causes the change storage 17 to store, as the change, the added character string "GM" and the characters "N" and "_" before and after the position in which the character string is added. The program name changer 16 applies the stored change to the other regular programs reserved for recording. At this time, for example, as shown in FIG. 16, there are two options "NNK_HSENGM_BSEN_FNL" and "NNK_HSEN_BSENGM_FNL" changed from the program name "NNK_HSEN_BSEN_FNL." The abbreviation "FNL" stands for "final episode." When there are options for the new program name, the program name changer 16 determines, as the new program name, the one having characters, at the highest matching rate, in common with the program name changed by the user. In the example of FIG. 16, "NNK_HSEN_BSENGM_FNL," which has characters in common at a higher rate, is employed as the new program name.

If both of deletion and addition of character strings are implemented, and there are options for the new program name, similar processing may be performed. In addition, if there are a plurality of character strings to be deleted or added, and there are options for the new program name, similar processing may be performed. For example, when the use deletes two of three "EN" contained in a program name, there are three options for the new program name. In this case, the one having characters in common with the target program at the highest rate may be determined as the new program name.

As described above, according to this embodiment, in the case where there are options for a new program name in changing the name of an associated program, the option having characters in common with the new program name of the target program at the highest rate is determined as the new program name. This results in reliable selection of a proper program name even when there are options for the name of an associated program.

In the example described above, in the case where there are options for the new program name of the associated program, the one having characters in common with the program name changed by the user at the highest rate is employed. However, the processing where there are options for the new program name is not limited thereto. For example, in the case where there are options for a new program name, these options may be displayed on the display 200, which is an example of a display, to cause the user to select any one of the options. The user selects one of the options using the remote controller 105, which is an example of an instruction input. The program name changer 16 may determine the selected option as the new program name of the associated program.

Third Embodiment

In the first and second embodiments described above, an example has been described where the user makes regular recording. Specifically, when the user reserves for recording regularly broadcast programs at one time and changes the name of one of the programs, the change is automatically reflected to the other regular programs.

On the other hand, in the third embodiment, when the user changes the name of a program (hereinafter referred to as a "target program"), an associated program searcher 18 searches for, as the associated programs, ones of programs for which information is stored in the program information DB 10. The programs have a specific attribute in common with the target program. The program name changer 16 changes the names of the found associated programs based on the change in the target program. The user changes the name of the target program, for example, in normal recording reservation, or viewing the list of reserved programs.

The associated programs may be searched for, for example, as follows. For example, the associated programs may be the programs having a channel, a broadcast day of week, and a broadcast slot in common with the target program. In this case, the channel, the broadcast day of week, and the broadcast slot are used as the specific attribute. As an alternative, the associated programs may be the programs having part of the name in common with the target program. Specifically, for example, the associated programs may be the programs having names containing characters in common with the original name of the target program in the respective positions. The number of the characters is larger than or equal to a predetermined threshold. In this case, the program names are used as the specific attribute. Programs of a drama series, for example, may have the same series ID in common. Thus, the programs having the program ID in common with the target program may be the associated programs. In this case, the program ID is used as the specific attribute.

Figure 17:
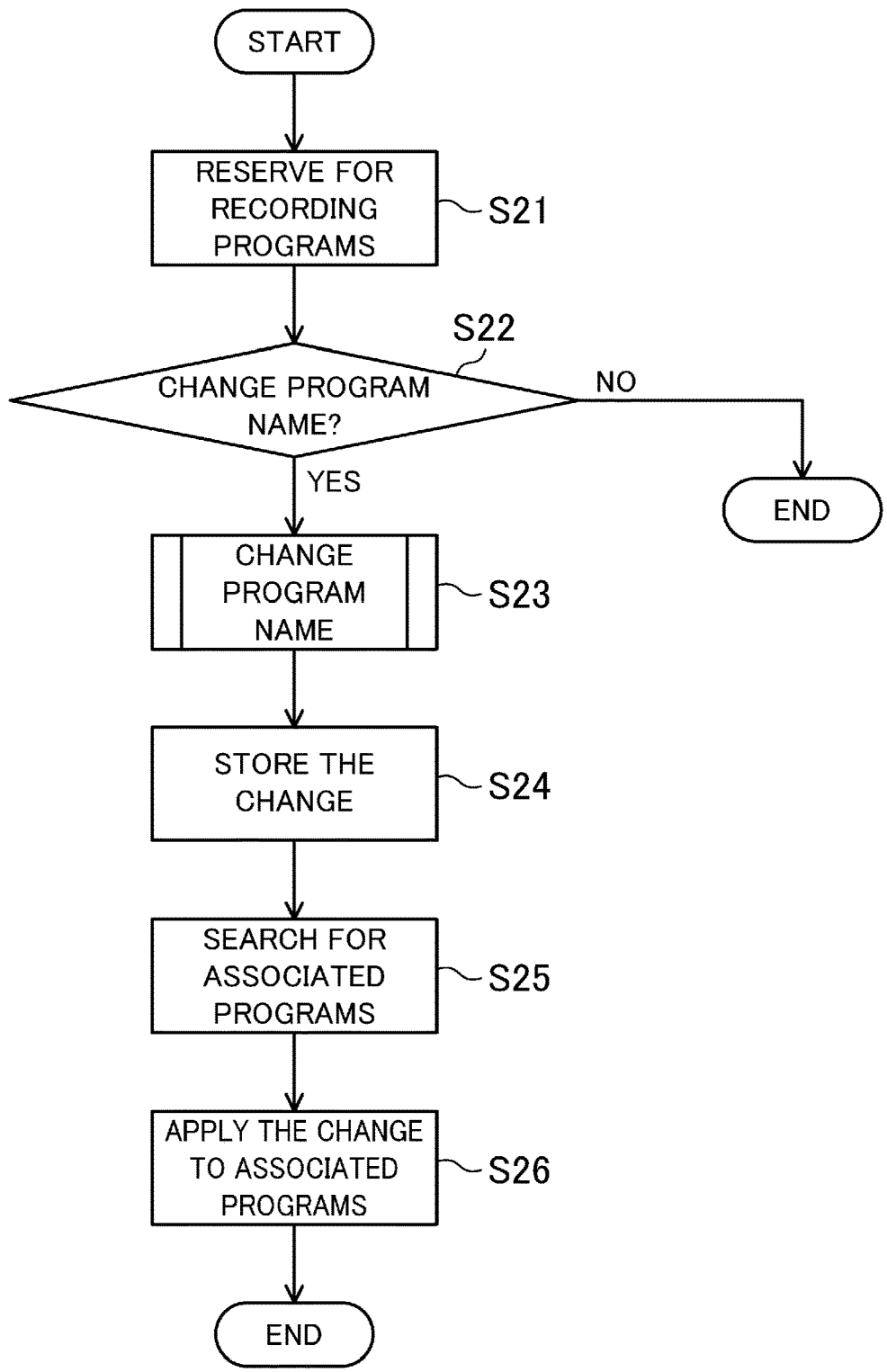
FIG. 17 is a flow chart illustrating exemplary processing for changing a program name according to a third embodiment.

FIG. 17 is an exemplary flow chart illustrating an exemplary procedure for changing program names in this embodiment, assuming that the program names are changed when the user makes normal recording reservation.

First, the user makes recording reservation of a target program (S21). Then, the program DB 10 stores, as the reserved program information 12, information on the target program. The user changes the name of the target program (YES in S22). If there is no need to change the program name, the processing ends (NO in S22).

The program name is changed (S23) as described in the first and second embodiments. Based on the change in the program name, the program name changer 16 causes the change storage 17 to store, as the change, a deleted character string, an added character string, and a character(s) indicating the position in which the character string is added, for example (S24). The associated program searcher 18 searches for the programs associated with the target program among the programs for which information is stored in the program information DB 10 (S25). At this time, the associated program searcher 18 searches the reserved program information 12 for the associated programs among the programs reserved for recording, and the recorded program information 13 for the associated programs among the recorded programs. Alternatively, the associated program searcher 18 searches both the reserved program information 12 and the recorded program information 13 for the associated programs among both the programs reserved for recording and the recorded programs. The program name changer 16 changes the names of the found associated programs based on the change stored in the change storage 17 (S26).

Figure 18:
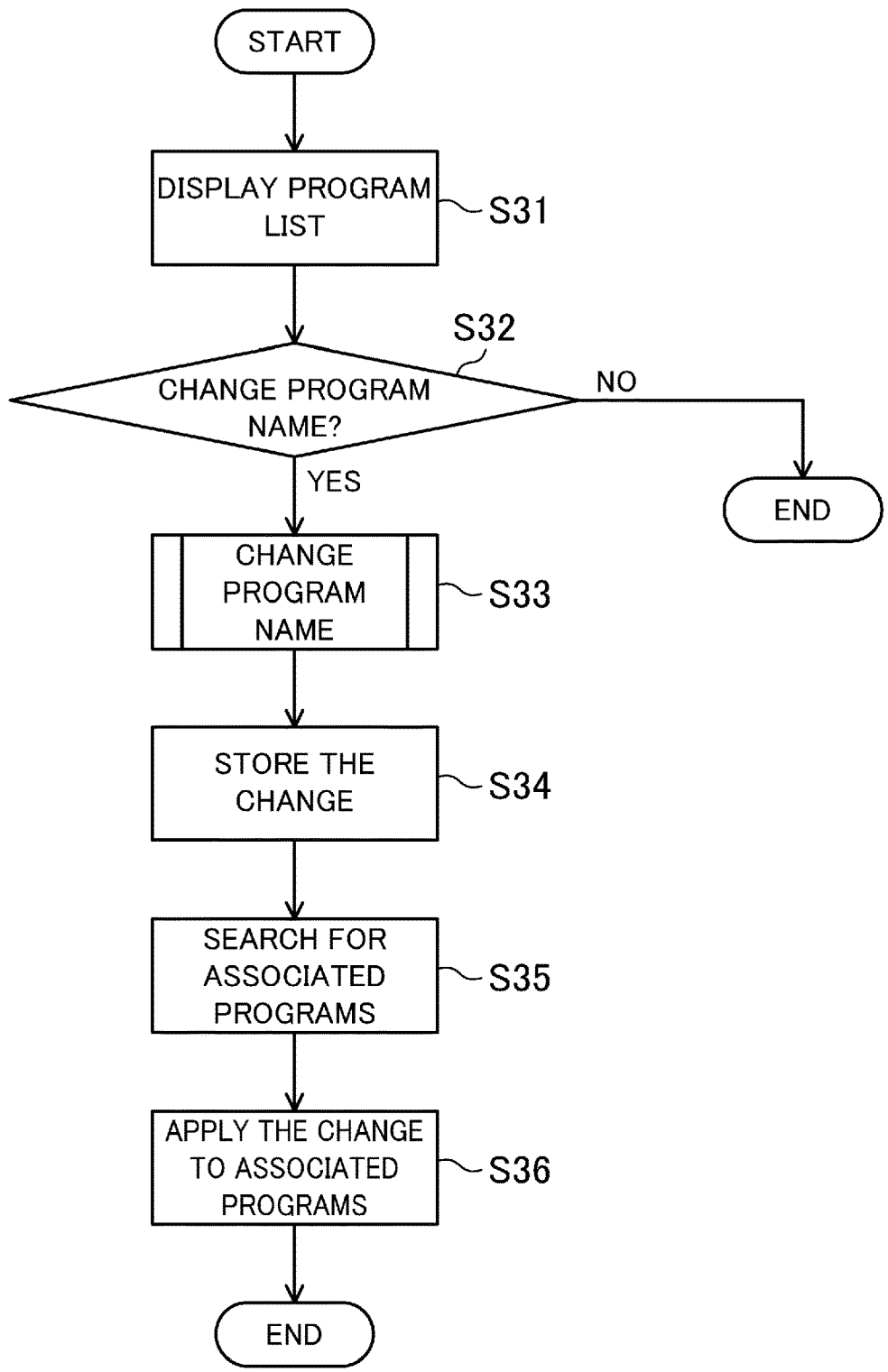
FIG. 18 is a flow chart illustrating exemplary processing for changing a program name according to a third embodiment.

FIG. 18 is a flow chart illustrating an exemplary procedure for changing program names in this embodiment, assuming that the program names are changed when the user views the list of the programs reserved for recording.

First, the user causes the user interface of the display 200 to display the list of the programs reserved for recording (S31). Then, the user changes the name of a program on the displayed program list (YES in S32). If there is no need to change the program name, the processing ends (NO in S32).

The program name is changed (S33) as described in the first and second embodiments. Based on the change in the program name, the program name changer 16 causes the change storage 17 to store, as the change, a deleted character string, an added character string, and characters indicating the position in which the character string is added, for example (S34). The associated program searcher 18 searches for the programs associated with the target program among the programs for which information is stored in the program information DB 10 (S35). What are to be searched for the associated programs are similar to those in S25 of FIG. 17. The program name changer 16 changes the names of the found associated programs based on the change stored in the change storage 17.

As described above, according to this embodiment, when the program name changer 16 changes the name of the target program, the associated program searcher 18 searches for, as the associated programs, ones of the programs for which information is stored in the program information DB 10. The programs have a specific attribute in common with the target program. Then, the program name changer 16 changes the names of the associated programs found by the associated program searcher 18 based on the change in the target program. Accordingly, changing of the name of the target program made by a user is automatically reflected to the programs associated with the target program. This results in effective changing of the program names to improve user's convenience.

In the example described above, the user changes the name of the target program name in performing normal recording reservation or viewing the list of the reserved programs. However, the time of changing the name of the target program is not limited thereto in this embodiment.

Alternatively, targets whose names are to be changed automatically are selectable from the programs reserved for recording and/or the recorded programs by default or by the user. The names of the associated programs to be changed may be displayed on the display 200 to cause the user to confirm whether or not the changing of the program names is acceptable.

Other Embodiments

In the embodiments described above, based on the change in the name of the target program, the program name changer 16 may cause the change storage 17 to store the original program name of the target program together with the change. It is then easy to return the program names back to the original ones.

In the recording and reproducing apparatus 100, the targets whose names are to be changed are not limited to TV programs and may be radio programs. The targets are also not limited to broadcast programs and may be on-demand programs or network programs.

In the embodiments described above, the recording and reproducing apparatus 100 is a hard disk recorder or a BD recorder, for example, but not limited thereto. The recording and reproducing apparatus 100 may be, for example, a television with recording and reproducing functions. The instruction input is not limited to the remote controller 105, and may be, for example, a touch panel.

What is claimed is:

1. A recording and reproducing apparatus comprising:
a database storing information on programs reserved for recording and/or recorded programs, the information containing at least program names;
a controller configured for changing a name of a target program, for which information is stored in the database, in accordance with an instruction made via an instruction input; and
a storage storing the change made by the controller, wherein:
the controller changes, based on a change in the name of the target program, a name(s) of associated one(s) of programs for which information is stored in the database, the associated one(s) having a specific attribute in common with the target program,
the controller causes the storage to store the change in the name of the target program,
the controller reads the change from the storage in changing the name(s) of the associated one(s) of programs, and
in a case of deleting a character string as changing of the name of the target program, the controller causes the storage to store the deleted character string as the change.

2. The apparatus of claim 1, wherein the controller causes a display to display a user interface, for changing the program names, including the name of the target program, and receives the instruction for changing the name of the target program via the instruction input.

3. The apparatus of claim 2, wherein, in the name of the target program displayed in the user interface, a character string displayable on a program list and a character string not displayable are distinguishable.

4. The apparatus of claim 1, wherein, in a case of adding a character string as changing of the name of the target program, the controller causes the storage to store the added character string and at least one character before and/or after a position, in which the character string is added, as the change.

5. The apparatus of claim 1, wherein, based on the change in the name of the target program, the controller causes the storage to store an original program name of the target program together with the change.

6. The apparatus of claim 1, wherein, in a case of adding a character string and deleting a character string as changing of the name of the target program, the controller causes the storage to store the added character string, at least one character before and/or after a position, in which the character string is added, and the deleted character string as the change.

7. The apparatus of claim 1, wherein the controller changes the name(s) of the associated one(s) based on the change read from the storage.

8. The apparatus of claim 1, wherein the controller causes the display to display the name(s) of the associated one(s) to be changed.

9. The apparatus of claim 1, wherein, in a case where there are options for a new name(s) in changing the name(s) of the associated one(s), the controller determines, as the new name(s) of the associated one(s), one of the options having characters in common with a new name of the target program at a highest rate.

10. The apparatus of claim 1, wherein, in a case where there are options for a new name(s) in changing the name(s) of the associated one(s), the controller determines, as the new name(s) of the associated one(s), one of the options displayed on the display and selected via the instruction input.

11. The apparatus of claim 1, wherein, based on a change in a name of any of a series of regularly broadcast programs as the target program, the controller changes names of the other programs of the series as the associated ones.

12. The apparatus of claim 1, further comprising:
a searcher searching for, as the associated one(s), one(s) of the programs for which information is stored in the database, the one(s) having a specific attribute in common with the target program,
wherein the controller changes, based on the change in the target program, the name(s) of the associated one(s) found by the searcher.

13. The apparatus of claim 12, wherein the searcher uses, as the specific attribute, a channel, a broadcast day of week, and a broadcast slot to search for, as the associated one(s), one(s) of the programs having the channel, the broadcast day of week, and the broadcast slot in common with the target program.

14. The apparatus of claim 12, wherein the searcher uses program names as the specific attribute to search for, as the associated one(s), one(s) of the programs having a name(s) containing characters in common with the original program name in respective positions, the number of the characters is larger than or equal to a predetermined threshold.

15. The apparatus of claim 12, wherein the searcher uses program ID as the specific attribute to search for, as the associated one(s), one(s) of the programs having the program ID in common with the target program.

16. The apparatus of claim 1, wherein the program names are changeable at, at least one of: a time of recording reservation, a time of displaying a list of the programs reserved for recording, or a time of displaying a list of the recorded programs.

17. The apparatus of claim 1, wherein a target(s) whose name(s) is/are to be changed is/are selectable from the programs reserved for recording and/or the recorded programs.

18. A recording and reproducing apparatus comprising:
a database storing information on programs reserved for recording and/or recorded programs, the information containing at least program names; and
a controller configured for changing a name of a target program, for which information is stored in the database, in accordance with an instruction made via an instruction input,
wherein:
the controller changes, based on a change in the name of the target program, a name(s) of associated one(s) of programs for which information is stored in the database, the associated one(s) having a specific attribute in common with the target program, and
in a case where there are options for a new name(s) in changing the name(s) of the associated one(s), the controller determines, as the new name(s) of the associated one(s), one of the options having characters in common with a new name of the target program at a highest rate.

19. A recording and reproducing apparatus comprising:
a database storing information on programs reserved for recording and/or recorded programs, the information containing at least program names;
a controller configured for changing a name of a target program, for which information is stored in the database, in accordance with an instruction made via an instruction input; and
a searcher searching for, as the associated one(s), one(s) of the programs for which information is stored in the database, the one(s) having a specific attribute in common with the target program,
wherein:
the controller changes, based on a change in the name of the target program, a name(s) of associated one(s) of programs for which information is stored in the database, the associated one(s) having a specific attribute in common with the target program, and
the controller changes, based on the change in the target program, the name(s) of the associated one(s) found by the searcher.

* * * * *